Patented Mar. 26, 1929.

1,706,866

UNITED STATES PATENT OFFICE.

RUDOLPH WEIMER, OF SHEBOYGAN, WISCONSIN.

ENAMELING COMPOSITION.

No Drawing. Application filed July 24, 1925. Serial No. 45,944.

This invention relates to improvements in enameling composition more particularly adapted for coating cast iron, sheet iron and sheet steel.

In the enameling art there are different kinds of enameling which in the nomenclature of the trade are known as one, two, three and four coated ware. Each coat requires its specific physical and chemical qualities, although each one is a vitrifiable composition consisting primarily of quartz, feldspar, fluorspar, clay, magnesia, soda, potash, saltpetre, borax and different metallic oxides for coloring matter. The weighed ingredients are mixed, melted and ground to form a liquid "slip" into which the ware to be coated is dipped and when dry, is fused in a hot muffle to cover the metal surface of the ware. Four single burnings are required to produce a four coated piece of ware. The first coat of enamel has therefore to withstand the whole fire efforts of the four burnings in the regular course of production. Too many fires and too high a temperature may create combustion or cause a chemical reaction injurious to the product by burning the life and strength out of one of the materials. In the art, the first coat is called the "ground coat", in view of its importance in forming a reliable foundation for the succeeding covercoats by means of a thorough appropriate combination between the metal surface and the glossy enamel coatings, two materials absolutely different in nature and physical and chemical qualities.

The first requirement in an efficient enamel is that it shall adhere to the metal under stress of changes in temperature due through the proper balance of a ground coat capable of neutralizing the difference between the co-efficient of expansion and contraction of the metal and the glass enamel. Therefore, the selection of a good reliable ground-coat composition which provides the requisite durability, resistance, strength and elasticity, and which is unaffected throughout the manipulations during the regular course of manufacture, is essential to the success of the production.

To retain and conserve the original life of the ground coat during all of the firing, it is known to use a so-called "cold" ground coat, which term indicates that the ingredients are used in a raw state or form. This use has not been found commercially practical, due to the fact that there is insufficient melting in the muffle oven, which results in blisters, and this and other defects are developed in the finished enamel. Furthermore, the customary melted ground coat, when applied to the ware and dried before it is fused in the muffle oven, scratches and wipes off very easily during its progress of manufacture, and inevitable damage and expense is caused thereby. Also, the melted ground coat forms a rough uneven surface.

It is one of the objects of this invention to overcome the before mentioned objectionable features and provide an enameling composition in which a cold ground coat has been devised with all of the properties necessary to produce the desired result.

A further object of the invention is to provide an enameling composition in which broken pieces of glass are used to control the melting point of the cold ground coat to suit the various materials desired to be enameled.

A further object of the invention is to provide an enameling composition in which broken pieces of porcelain are used to evade an affinity for a peculiar chemical action on the surface of the burnt-in ground coat by the incandescent clay contents of the added porcelain in combination with boric acid.

A further object of the invention is to provide an enameling composition in which use is made of the defective and broken pieces of porcelain material now ordinarily wasted.

A further object of the invention is to provide an enameling composition in which the usual melting process at the melting furnace, for the cold enamel ground coat, is eliminated, thus materially saving in manufacturing costs.

A further object of the invention is to provide an enameling composition which is simple and durable, and is well adapted for the purpose desired.

With the above and other objects in view, the invention consists of the improved enameling composition and its parts and combinations as set forth in the claims, and all equivalents thereof.

The improved enameling composition consists of a ground mixture of silica, clay, lime, natrium, boracic acid, broken pieces of glass and porcelain and water, used in the customary way and method. In preparing the composition, I prefer to use the ingredients in the following proportions, viz: fifty-two to sixty-seven parts of silica, fourteen to seventeen parts of clay and lime, twenty-four parts of natrium, twelve parts of boracic acid, forty to sixty parts of broken pieces of glass and porcelain, ground and mixed together in water in a ball mill and treated and used in the ordinary manner.

The proportional amount of glass pieces provides a means for controlling the melting point of the cold ground coat with reference to prevailing conditions, while the proportional amount of porcelain pieces creates, in combination with the boric acid, an affinity for a peculiar chemical action on the surface of the burnt-in ground coat, most favorable for the enameling process.

As the cold ground coat is composed of only non-reducing materials and burns therefore to a smooth porcelain-like surface having an elastic strength to neutralize and balance the naturally different degrees of co-efficient of expansion between the metal to be coated and the enamel cover coats applied thereon. The ground coat is applied to cast iron, sheet iron and sheet steel in a raw unmelted condition, and when dry it sticks like cement on the metal surface, and cannot be scratched or wiped off during the course of shop practice, which under the ordinary process causes a great loss. The application of the improved ground coat forms a surface which, when burned or fused in the muffle oven, will form a smooth glassy surface for receiving the cover coats.

From the foregoing description, it will be seen that the improved enameling composition is very simple, and is well adapted for the purpose described.

What I claim as my invention is:

1. An enameling composition, consisting of a cold ground coating composition formed of ground silica, clay, lime, soda, boracic acid, broken pieces of glass and porcelain and water for application in a cold condition.

2. An enameling composition, consisting of a cold ground coating composition formed of fifty-two to sixty-seven parts of silica, fourteen to seventeen parts of clay and lime, twenty-four parts of soda, twelve parts of boracic acid, forty to sixty parts broken pieces of ordinary glass and ordinary porcelain, and water in a condition of having been mixed in a mill.

3. An enameling composition, consisting of a cold ground coating composition formed of fifty-two to sixty-seven parts of silica, fourteen to seventeen parts of clay and lime, twenty-four parts of soda, twelve parts of boracic acid, broken pieces of ordinary glass to produce predetermined melting degree of the coat, sufficient broken pieces of ordinary porcelain to produce a chemical action on the surface of the ground coat most favorable for a cover coat of enamel, and water in a condition of having been together in a mill for use as a cold ground coat.

4. An enameling composition for a ground coating composition for coating metal and which may be applied in a raw cold condition, consisting of the ordinary ground coat ingredients and broken pieces of ordinary porcelain in a condition of having been ground into the ingredients.

5. An enameling composition for a ground coating composition for coating metal and which may be applied in a raw cold condition, consisting of silica, clay, lime, soda, boracic acid, broken pieces of ordinary glass and water, characterized by the addition of broken ordinary porcelain, all of the ingredients being in a condition of having been mixed and ground together.

In testimony whereof, I affix my signature.

RUDOLPH WEIMER.